UNITED STATES PATENT OFFICE.

WILLIAM MUIRHEAD, OF SHETTLESTON, SCOTLAND.

PURIFYING CAST-IRON IN THE MANUFACTURE OF BASIC OPEN-HEARTH STEEL.

No. 894,779.  Specification of Letters Patent.  Patented July 28, 1908.

Application filed April 30, 1908. Serial No. 430,165.

*To all whom it may concern:*

Be it known that I, WILLIAM MUIRHEAD, iron and steel merchant and manufacturer, a subject of the King of Great Britain and Ireland, and a resident of Shettleston, Lanarkshire, Scotland, have invented certain new and useful Improvements in Purifying Cast-Iron in the Manufacture of Basic Open-Hearth Steel, of which the following is a specification.

My improvements consist of a continuous and connected method and process of refining or oxidizing the metalloids in ordinary cast iron scrap, cast iron borings and burned cast iron scrap in open hearth furnaces, and in the production therefrom of basic open hearth or converter steel suitable for rolling and other purposes.

My improvements comprise the de-siliconizing or purifying of cast iron which can be utilized as a special preparation in the liquid state as a substitute for pig iron in manufacturing basic open hearth or converter steel and has for its object the economical production of such steel. This partly or wholly de-siliconized, or refined liquid cast iron is produced by the following method. Into an open hearth Siemens, preferably acid lined, or other suitable melting furnace, is charged under my improvements any kind whatever of ordinary old cast iron scrap, including burned scrap, irrespective of its quality, or weight. The size of the furnace to be used is determined by the quantities required to be melted and refined. The method of making this de-siliconized or refined liquid cast iron, lends itself to dealing with large, or small quantities, but the larger the better for the sake of economy, and the method preferred is first to put in a charge of cast iron scrap and when this is melted, to make from time to time additions of cast iron borings. It has been found in actual practice that by my method these additions of cast iron borings, not only melt satisfactorily, but also yield up their weight to and amalgamate with the liquid charge of cast metal in the melting furnace bath instead of being burned away or oxidized owing to their fine state of division. At the same time the borings or turnings have a refining action whereby the silicon in the original cast iron, and also the silicon in the borings themselves becomes reduced to within proper limits from an amount that makes both the original cast iron and the borings unsuitable in their natural state for making basic open hearth or converter steel, owing to the corrosive action of the silicon in them on the fettling of a basic open hearth furnace or the lining of a converter.

The constituents of ordinary cast iron scrap or cast iron borings may be summed up by the following, namely, metallic iron, carbon, silicon, manganese, sulfur and phosphorus. The percentages of these constituents are approximately:—

| | |
|---|---|
| Metallic iron ___ by difference __ | 92.28 |
| Carbon _____ | 3.25 |
| Silicon _____ | 2.40 |
| Manganese _____ | 1.00 |
| Sulfur _____ | .07 |
| Phosphorus _____ | 1.00 |
| | 100.00 |

Practically speaking, only the first four of the six constituents above mentioned are affected in quantity by combustion or oxidation in my process of refining as already described. But for the purpose in view it should be sufficient to refer only to the change that takes place in the percentages of the silicon and carbon. These constituents will be reduced to something like 1.00 per cent. and 2.50 per cent. respectively depending on the extent to which the refining might be carried.

In my process of refining it has been found, with a melting charge of cast iron scrap alone, that after melting and simply maintaining heat, but with no further additions, that the silicon and the carbon gradually became reduced to within the required limits, by simple oxidation or combustion. It has been further found when the melting charge consisted of about two-thirds cast iron scrap, and say about one third of cast iron borings, the latter gradually added to the cast iron after it became melted, that the elimination of the silicon and carbon became expedited, and the process thereby shortened, than if no borings had been used and that also by simple oxidation or combustion. The reduction of silicon so effected facilitates the safe, perfect and economical manufacture of the steel.

In practice I have found that from 30 to 40 per centum of cast iron borings produces good results; but the percentages will depend on the nature and richness of the bath of cast iron scrap undergoing refining.

As it is necessary to approximately determine the percentage of silicon present in the bath of metal, "spoon" samples of the refined metal are taken from time to time from the bath and cast against a cast iron chill block, the percentage of silicon becoming known by the depth of chill of the sample.

The outstanding advantage of being able to use the old cast iron borings, sometimes but rarely called turnings, in the manner I have described is the great economy in cost of producing this refined and de-siliconized liquid cast iron for its subsequent conversion into basic open hearth or converter steel. The cast iron melting furnace used is preferably acid lined, as the phosphorus is subsequently eliminated in converting the refined liquid cast iron into steel. When the liquid refined metal is at the stage for tapping, it is run, preferably by gravitation, or ladling by mechanical means into an open hearth basic Siemens furnace already heated and charged with a proportion of steel turnings, (malleable iron and steel turnings) or ordinary steel scrap, or malleable iron scrap, and these after being brought to a fluid condition and with the necessary additions of limestone, lime, rolling mill scale, cinder, or other oxids are converted into steel in the usual way. Or the de-siliconized cast iron may be conveyed to a converter and made direct into steel.

In a refining melting charge of cast iron scrap or the like, it has been found that a suitable average proportion of the several constituents would be 6 tons of cast iron scrap and 3 tons of cast iron borings; and when burned cast iron scrap is used the charge may consist entirely of this. This charge after refining is in its liquid state transferred as previously described into an open hearth basic steel melting furnace, which has already been charged with from say 9 to 11 tons of iron or steel turnings or other malleable scrap and reduced to a fluid condition and the whole charge converted into steel in an ordinary manner.

In my process practically speaking, by the term desiliconizing is meant the elimination by oxidation or combustion, as described in the body of the specification, of say 50 to 75 per centum of the silicon from ordinary cast iron scrap, cast iron borings, or burned cast iron scrap which usually contain say about 2 to 3 per centum of the element silicon whereby it becomes reduced to a limit of something like .5 to 1 per centum in my liquid refined cast iron. Of course the percentage of silicon may be lowered or raised in the refined liquid cast iron beyond these limits by my process if so required, for subsequent conversion into basic open hearth or converter steel.

What I claim as my invention and desire to secure by Letters Patent is:—

1. A process of making steel which consists in melting a charge of cast iron scrap in an open hearth furnace, adding cast iron borings gradually to the molten charge in suitable proportion up to 40% of the original charge to expedite the removal of the silicon present, and converting the refined metal so produced into steel, substantially as described.

2. A process of making steel which consists in melting a charge of cast iron scrap in an open hearth acid lined furnace, adding cast iron borings gradually to the molten charge in suitable proportion up to 40% of the original charge to expedite the removal of the silicon present, and converting the refined metal so produced into steel, substantially as described.

3. A process of making steel which consists in melting a charge of cast iron scrap in an open hearth furnace, adding cast iron borings gradually to the molten charge in suitable proportion up to 40% of the original charge to expedite the removal of the silicon present, leading the molten metal so refined to a basic open hearth furnace previously heated and charged with malleable scrap, and converting the combined charge into steel, substantially as described.

In testimony whereof I have signed my name to this specification, in the presence of two subscribing witnesses.

WM. MUIRHEAD.

Witnesses:
   R. C. THOMSON,
   THOMAS P. BROWNLIE.